PATENTED MAR 12 1974        3,796,479
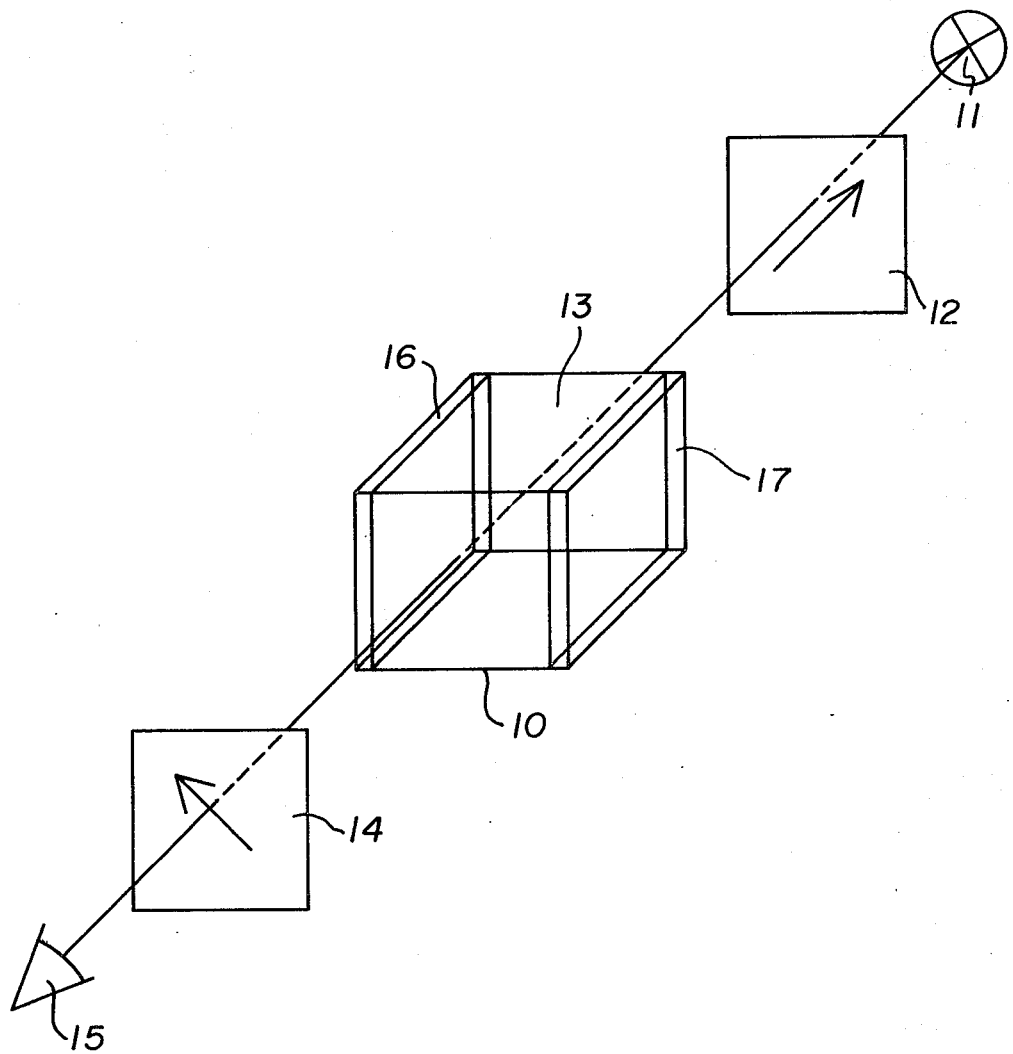

3,796,479

ELECTRO-OPTICAL LIGHT-MODULATION CELL UTILIZING A NEMATOGENIC MATERIAL WHICH EXHIBITS THE KERR EFFECT AT ISOTROPIC TEMPERATURES

BRIEF SUMMARY OF THE INVENTION

The invention relates to an electro-optical light-modulation cell, including a dielectric which is disposed between electrodes and which, being comprised of a nematogenic fluid in the isotropic state, upon application of a voltage to the electrodes, becomes doubly refracting as a result of the electro-optical Kerr effect.

DETAILED DESCRIPTION OF THE INVENTION

Light modulation cells or Kerr cells are known and until now nitrobenzene, because of its high Kerr constant, has been the only substance used as the dielectric.

However, Kerr cells having a nitrobenzene dielectric have the disadvantage of requiring operating voltages of several kilovolts. Operation of such a cell places exacting requirements on the rise times and the high-voltage breakdown strength of an associated electronic control system. Consequently, when the cells are intensively modulated, it is impossible to make use of the theoretically very short response time of nitrobenzene. A further disadvantage of Kerr cells having a nitrobenzene dielectric comprises the fact that they need to be relatively thick in the direction of the light beam. For example, the thickness of the dielectric parallel to the light beam must be 5 cm. in order to produce a phase difference of $\delta = 0.835\ \lambda$ ($\lambda = 583\ \mu m$, $T = 24°\ C.$) at a field strength of 24 kV cm$^{-1}$. Cells of this thickness are unsuitable for a number of practical applications.

The present invention provides an electro-optical light-modulation cell which is very quickly responsive and one requiring a control voltage in the range which only necessitates the utilization of relatively inexpensive circuitry, using transistors where possible.

In particular, the present invention relates to an electro-optical light-modulation cell having a dielectric disposed between electrodes which becomes doubly refracting upon an application of a voltage to the electrodes, in which the improvement is a dielectric comprised of a nematogenic fluid in the isotropic state.

Preferably, the nematogenic fluid is at a temperature near the temperature $T_c$ of the phase change between the isotropic and the anisotropic state.

In order that the invention may be readily understood, an embodiment thereof will now be described in more detail, by way of example, with reference to the accompanying drawing. The FIGURE shows a light-modulation arrangement including a light-modulation cell embodying the invention.

As shown in the FIGURE, a light-modulation cell 10 comprises two parallel rectangular electrodes 16 and 17 between which is disposed of a dielectric 13 composed of a nematogenic substance. The electrodes are made of stainless steel, but can be made of any other metal, which does not react with nematogenic substances, for example, gold or the like.

The distance between the electrodes depends on the diameter of a light beam which is to be modulated. In the example, this distance is so small that the nematogenic substance is held between the electrodes by capillary forces. In such a case, no additional walls are needed for laterally binding the space between the electrodes. If the distance between the electrodes is greater, the space for the dielectric must be sealed on all sides, using plates of suitable size and made of electrically insulating material. At least two opposite insulating plates must be transparent to the light beam, i.e., they should advantageously be made of glass, acrylic glass or the like.

The dielectric is made of a nematogenic substance, i.e., a substance having a nematic liquid-crystal phase over a certain temperature range. Specially good results are obtained with nematogenic substances which are dielectrically and optically strongly anisotropic and which have a pronounced electric dipole moment extending parallel to the direction of maximum polarizability of the molecules. The substances must also have a marked tendency for parallel orientation over a number of molecular spacings, i.e., the tendency to form clusters. Since the tendency to form clusters is particularly marked in the immediate neighborhood of the temperature $T_c$ at which there is a change from the isotropic to the nematic state, the cell is desirably operated in the temperature range $T_c < t \leq T_c + 1°\ C.$ The following nematogenic substances and mixtures have been found particularly suitable:

A 1:1:1-mixture of N-(4'-butoxy-benzylidene)-4-aminobenzonitrile, N-(4'-hexoxybenzylidene)-4-aminobenzonitrile and N-(4'-octoyloxybenzylidene)-4-aminobenzonitrile; N-(4'-ethoxybenzylidene)-4-aminobenzonitrile, or PEBAB; a 1:1-mixture of N-(4'-butoxybenzylidene)-4-aminobenzonitrile and N-(4'-butoxybenzylidene)-4-nitroaniline; 4'-cyanophenyl-4-hexoxybenzoate; 4-cyano-4'-hexoxyazobenzene; a 9:1-mixture of N-(4'-butoxybenzylidene)-4-aminobenzonitrile and N-(4'-dimethylaminobenzylidene)-4-nitroaniline; or an 85:15-mixture of N-(4'-butoxybenzylidene)-4-aminobenzonitrile and N-(4'-dimethylaminobenzylidene(-4-aminobenzonitrile.

Of course there are a large number of other nematogenic substances and mixtures which, because of the aforementioned properties, are suitable for cells embodying the invention. For example, use can be made of substances having a nematogenic region which is so small that the change is substantially from solid crystalline state to the isotropic state.

The light modulating arrangement shown in the FIGURE comprises, in addition to a cell 10, a polarizer 12 disposed upstream of the cell and an analyzer 14 disposed downstream of the cell. A beam of light from a source 11 travels through polarizer 12 and cell 10 parallel to the electrodes and strikes analyzer 14. If the polarizer 12 and analyzer 14 are rotated 90° relative to one another as shown by the arrow in the FIGURE and if the dielectric of cell 10 is isotropic, the light beam does not reach the eye of an observer downstream of the analyzer 14.

If a d.c. (direct current) voltage is applied to the electrodes of cell 10, the dielectric 12 becomes doubly refracting, so that the linearly polarized light from polarizer 12 is converted to elliptically polarized light, some of which can travel through the analyzer 14. The observer thereby notices a brightening of his field of view through the analyzer.

Maximum brightening occurs at an optical phase difference of $\delta = (2i+1)\ \lambda/2$, with $i = 0, 1, 2\ldots$ The optical phase difference is directly proportional to the wavelength, the thickness of the cell or dielectric parallel to the light beam, the Kerr constant and the square of the electric field strength.

The Kerr constant $\delta$ of the 1:1:1-mixture of N-(4'-butoxybenzylidene)-4-aminobenzonitrile, N-(4'-hexoxybenzylidene)-4-aminobenzonitrile and N-(4'-octyloxybenzylidene)-4-aminobenzonitrile has the value of $4.2 \cdot 10^{-10}$ mV$^{-2}$ at $T_c + 0.1°$ C (with $T_c = 93.3°$ C), and such value is 145 times as great as the Kerr constant of nitrobenzene. Consequently, the voltage at the electrode of a cell having a 1:1:1 mixture dielectric can be lower by a factor of $\sqrt{145} \approx 12$ in order to produce the same optical phase difference as in a geometrically identical Kerr cell having a nitrobenzene dielectric. Alternatively, if the electrode voltage is unchanged, the thickness of the 1:1:1-mixture cell in the direction of the beam can be 145 times less than thickness of a nitrobenzene cell.

For example, an electrode voltage of 730 V is required for maximum brightening ($\delta = \lambda/2$) in a cell having the 1:1:1-mixture dielectric, an electrode spacing of 1.5 mm and a thickness of 5 mm in the direction of the beam. A geometrically identical nitrobenzene cell would require an electrode voltage of 8,800 V for complete modulation (equals maximum brightening). Consequently, a transistorized electronic control system can be used for a cell having the 1:1:1-mixture dielectric, but not for a nitrobenzene cell.

The light-modulation cell described can operate on d.c. (direct current) or a.c. (alternating current). Measurements have shown that it is independent of frequency up to 200 kHz.

An important criterion of the capacity of electro-optical light-modulation cells is the attainable contrast between the light intensity when no voltage is applied to the electrodes and the light intensity at maximum drive. The contrast obtainable in a cell embodying the invention is of the order of 1:1,000, and varies with the fourth power of the field strength.

Electro-optical light-modulation cells embodying the invention are suitable for a number of applications. In general, they can be used for controlling and modulating light far beyond the acoustic frequency range. An important application is to electronic shutters, particularly in cases in which large apertures are required. In very specific applications the double refraction may be optically induced, e.g., by the field of high-powered light sources.

We claim:

1. In an electro-optical light-modulation cell having a dielectric which is disposed between electrodes and which becomes doubly refracting on application of a voltage to the electrodes, the improvement which comprises a dielectric comprised of a nematogenic fluid in the isotropic state.

2. A cell in accordance with claim 1, wherein the nematogenic fluid is at a temperature near the temperature $T_c$ of the phase change between the isotropic and the anisotropic state.

3. A cell in accordance with claim 2, wherein the temperature $t$ of the nematogenic fluid is in the range $T_c < t \leq T_c + 1°$ C.

4. A cell in accordance with claim 3, wherein the dielectric comprises a 1:1:1-mixture of N-(4'-butoxybenzylidene)-4-aminobenzonitrile, N-(4'-hexoxybenzylidene)-4-aminobenzonitrile and N-(4'-octyloxybenzylidene)-4-aminobenzonitrile.

5. A cell in accordance with claim 3, wherein the dielectric comprises N-(4'-ethoxybenzylidene)-4-aminobenzonitrile.

6. A cell in accordance with claim 3, wherein the dielectric comprises a 1:1-mixture of N-(4'-butoxybenzylidene)-4-aminobenzonitrile and N-(4'-butoxybenzylidene)-4-nitroaniline.

7. A cell in accordance with claim 3, wherein the dielectric comprises 4'-cyanophenyl-4-hexobenzoate.

8. A cell in accordance with claim 3, wherein the dielectric comprises 4-cyano-4'-hexoxyazobenzene.

9. A cell in accordance with claim 3, wherein the dielectric comprises a 9:1-mixture of N-(4'-butoxybenzylidene)-4-aminobenzonitrile and N-(4'-dimethylaminobenzylidene)-4-nitroaniline.

10. A cell in accordance with claim 3, wherein the dielectric comprises an 85:15-mixture of N-(4'-butoxybenzylidene)-4-aminobenzonitrile and N-(4'-dimethylaminobenzylidene)-4-aminobenzonitrile.

11. A cell in accordance with claim 3, which comprises polarizers for continuously modulating light transmitted through the cell, one polarizer being disposed upstream of the cell and the other being disposed downstream of the cell in the direction of light traveling through the cell.

12. A cell according to claim 11, wherein the two polarizers are crossed.

* * * * *

UNITED STATES PATENT OFFICE
CERTIFICATE OF CORRECTION

Patent No. 3,796,479            Dated March 12, 1974

Inventor(s) Wolfgang Helfrich, Martin Schadt and Hanspeter Scherrer

It is certified that error appears in the above-identified patent and that said Letters Patent are hereby corrected as shown below:

Cover page, after "[21] Appl. No.: 270,779" insert:

[30] Foreign Application Priority Data

July 16, 1971    Switzerland    No. 010482/71

Column 4, claim 7, line 28, "hexobenzoate" should be:

hexoxybenzoate

Signed and sealed this 16th day of July 1974.

(SEAL)
Attest:

McCOY M. GIBSON, JR.    C. MARSHALL DANN
Attesting Officer    Commissioner of Patents